(12) United States Patent  
Burchett et al.

(10) Patent No.: US 8,122,989 B2
(45) Date of Patent: Feb. 28, 2012

(54) BATTERY BOX SYSTEM AND METHOD

(75) Inventors: Chad Burchett, Molndal (SE); Rodney Phillips, Trinity, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 381 days.

(21) Appl. No.: 12/086,808

(22) PCT Filed: Dec. 29, 2005

(86) PCT No.: PCT/US2005/047326
§ 371 (c)(1),
(2), (4) Date: Jun. 19, 2008

(87) PCT Pub. No.: WO2007/078284
PCT Pub. Date: Jul. 12, 2007

(65) Prior Publication Data
US 2009/0000843 A1  Jan. 1, 2009

(51) Int. Cl.
*B60R 16/04* (2006.01)
*B60S 5/06* (2006.01)

(52) U.S. Cl. ...................... 180/68.5; 429/100

(58) Field of Classification Search .................. 180/68.5; 429/96, 100
See application file for complete search history.

(56) References Cited

U.S. PATENT DOCUMENTS

| | | | |
|---|---|---|---|
| 416,359 A | 12/1889 | Cooley | |
| 1,038,162 A | 9/1912 | Levy | |
| 1,327,223 A | 1/1920 | Boyle | |
| 1,459,973 A * | 6/1923 | Colgan | 180/68.5 |
| 1,806,382 A | 5/1931 | Barlow | |
| 1,949,753 A | 3/1934 | Meadows | |
| 2,014,670 A | 9/1935 | Roche | |
| 2,092,507 A | 9/1937 | Haltenberger | |
| 2,645,299 A | 7/1953 | Vincent | |
| 3,929,202 A | 12/1975 | Hobbensiefken | |
| 3,998,290 A | 12/1976 | Sivers | |
| 4,013,300 A | 3/1977 | Berger | |
| 4,365,681 A * | 12/1982 | Singh | 180/68.5 |
| 4,579,090 A | 4/1986 | Konrath | |
| 4,681,179 A | 7/1987 | Hayashi | |
| 4,728,238 A | 3/1988 | Chisholm | |
| 5,086,860 A * | 2/1992 | Francis et al. | 180/68.5 |
| 5,460,234 A * | 10/1995 | Matsuura et al. | 180/65.1 |
| 5,488,808 A | 2/1996 | Cahill | |

(Continued)

FOREIGN PATENT DOCUMENTS

GB  2391206 A  2/2004

OTHER PUBLICATIONS

Supplementary European Search Report for corresponding European application No. EP 05 85 5821.

*Primary Examiner* — John Walters
(74) *Attorney, Agent, or Firm* — Martin Farrell; Michael Pruden

(57) ABSTRACT

In the preferred embodiments, a novel system and method is for mounting a battery box within a vehicle is disclosed. The system and method includes, among other things, a novel battery box that is mounted between two chassis frame members that extend lengthwise along the vehicle. The battery box is supported on the frame members via a plurality of uniquely designed and arranged bracket members.

12 Claims, 8 Drawing Sheets

U.S. PATENT DOCUMENTS

| | | |
|---|---|---|
| 5,509,495 A | 4/1996 | Havemann |
| 5,558,949 A * | 9/1996 | Iwatsuki et al. ............... 429/99 |
| 5,593,167 A | 1/1997 | Barnhardt |
| 5,620,057 A * | 4/1997 | Klemen et al. ............... 180/68.5 |
| 5,639,571 A | 6/1997 | Waters |
| 6,095,271 A * | 8/2000 | Dickie et al. ................. 180/68.5 |
| 6,188,574 B1 * | 2/2001 | Anazawa ..................... 361/695 |
| 6,230,834 B1 * | 5/2001 | Van Hout et al. ............ 180/68.5 |
| 6,231,266 B1 | 5/2001 | Gott |
| 6,367,646 B1 * | 4/2002 | Hoagland et al. ............ 220/533 |
| 6,505,696 B1 | 1/2003 | Prevost |
| 6,668,957 B2 | 12/2003 | King |
| 6,793,272 B2 | 9/2004 | Borugian |
| 2002/0130125 A1 | 9/2002 | Murofushi |

* cited by examiner

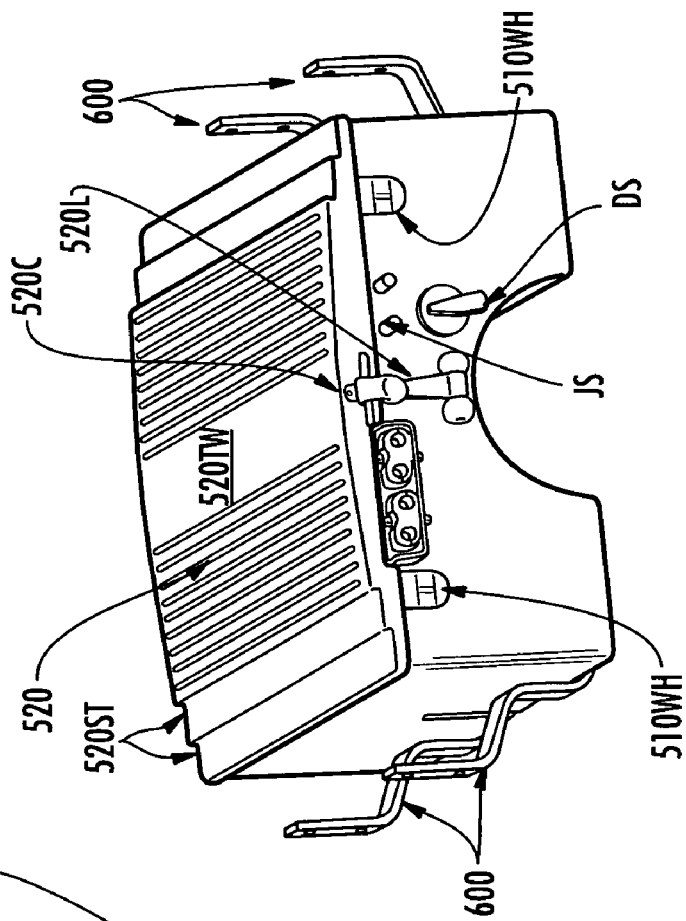
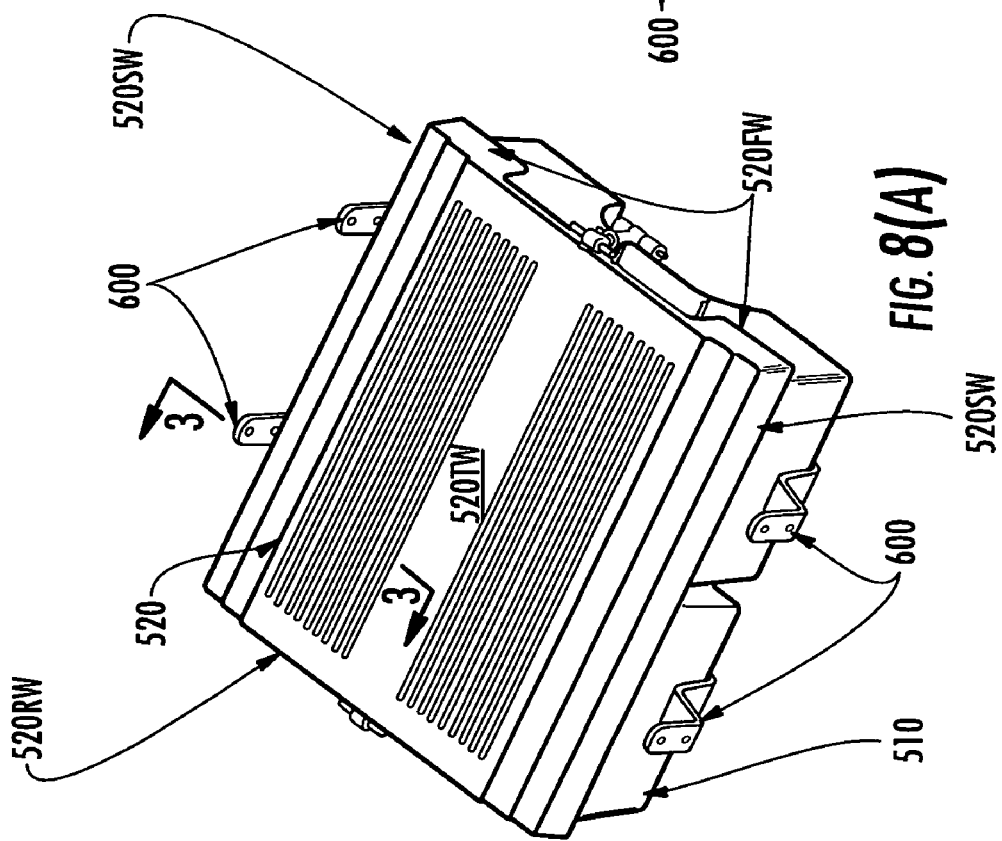
FIG. 8(A)
FIG. 8(B)

BATTERY BOX SYSTEM AND METHOD

INTRODUCTION

The present invention relates to vehicle parts and components, and the preferred embodiments relate, e.g., to systems and methods for mounting batteries and/or the like within vehicles, especially within, e.g., trucks, tractors and/or commercial vehicles.

BACKGROUND

In various vehicles, especially in trucks, tractors and commercial vehicles, there is often a need to mount batteries and/or other components within the vehicle.

An illustrative conventional vehicle within which batteries and/or the like are mounted is shown in FIG. 1. As shown, the vehicle 100 includes a forward cab section 200 for accommodating a vehicle operator and a chassis frame 300 having generally parallel frame members 310A and 310B extending substantially the entire length of the vehicle and having a plurality of cross-members (not shown) connecting between the frame members 310A and 310B.

As shown in FIG. 1, one or more deck plate 330, such as, e.g., deck plates 330A and/or 330B in the illustrated example, are commonly supported upon the frame members 310A and 310B. Among other things, the deck plate(s) can provide a) a surface upon which an individual can walk, b) a surface upon which physical items can be supported, and c) a protective surface for vehicle components there-under, such as, e.g., the drive shaft of the vehicle extending to the rear wheels W.

With trucks, trailers and/commercial vehicles, space within the vehicle frame is typically at a premium because the space typically must support assorted components, such as, by way of example, air tanks, service lines, fuel tanks, fuel and electrical lines, hydraulic lines and systems, drive trains and accessories, and/or the like.

In addition, such vehicles often carry multiple batteries, such as, e.g., three or four heavy duty batteries, for such purposes as providing adequate cranking power to start a large diesel engine, providing adequate power for lighting and accessories, and/or the like. Accordingly, a typical vehicle has also been equipped with a sturdy battery box for securely mounting and housing such batteries on the vehicle. This type of battery box occupies substantial space that significantly contributes to the problem of optimally locating the various necessary and desired components upon the vehicle.

Ideally, all components are mounted accessibly and at the same time positioned to leave adequate room for a comfortable operating compartment and an engine compartment of sufficient space to afford access to the engine and to other vehicle components, such as power steering and air conditioning units which are typically located in engine compartments. Further, all of the vehicle components should be sufficiently nested within or otherwise supported by the frame to allow adequate road clearance and to minimize interference with air currents generated by a moving vehicle. They should also be positioned to keep vehicle wind drag to a minimum for economy which is important for profitable vehicle operation.

An illustrative battery box structure in the background art is depicted in U.S. Pat. No. 5,593,167, of Volvo GM Heavy Truck Corporation (the '167 patent). The '167 patent shows: "[a]n over-the-highway truck or tractor vehicle having an elongate rail forming a portion of a vehicle frame and an improved battery box in the form of a unitary molded container defining multiple sides of a battery retention space." See Abstract. The '167 patent describes, among other things, "[s]tructure including a lower step fixedly connected to the rail [that] supports the container." Id.

While a number of systems and methods exist in the art, there is a continued need in the art for improved methods for mounting batteries and/or the like in trucks, tractors and/or other commercial vehicles. As set forth below, the preferred embodiments of the present invention provide notable advancements over the above references and other existing systems and devices.

SUMMARY

The present invention overcomes various deficiencies and problems found in the above and/or other background art.

Among other things, in some preferred examples, a vehicle with an improved battery box mounting structure is provided that includes: a) two frame members extending lengthwise along the vehicle; b) a battery box between the two frame members, the battery box including a base having a bottom wall with upwardly extending perimeter walls and a cover with downwardly extending perimeter walls; c) a plurality of bracket members attaching the battery box between the two frame members, wherein the bracket members are each fixedly attached to only one of the two frame members and are flexibly attached to the battery box so as to accommodate relative movement between the battery box and the frame members.

In some examples, the bracket members being flexibly attached includes the bracket members being mounted to the battery box with at least one resilient member between the bracket members and the battery box and/or includes the bracket members being mounted to the battery box with tolerance in movement between the bracket members and the battery box. In some configurations, the tolerance in movement includes at least one protrusion on one of the battery box or the brackets that is loosely received within at least one hole of the other of the battery box and the brackets. In some instances, the bracket members are generally U-shaped and wherein one leg of the U-shape is fixed to at least one of the frame members and another end of the U-shape is attached to the base of the battery box at a side opposite to a battery receptacle within the battery box, such that the U-shape extends beneath the receptacle. In preferred embodiments, the bracket members being flexibly attached includes the bracket members being mounted to the battery box with at least one resilient member between the bracket members and the battery box.

According to yet some other examples, a battery box assembly for a vehicle is provided that includes: a) a base having a bottom wall and outwardly tapered perimeter walls, the perimeter walls including at least one cutout portion; b) a cover configured so as to be mounted over the base and having outwardly inclined perimeter walls; c) the outwardly inclined perimeter walls of the cover extending over but spaced apart from the at least one cutout portion so as to form an air vent into an interior of the battery box. In the preferred implementations, the assembly further includes a plurality of bracket members adapted to attach the battery box between parallel frame members of a vehicle.

According to yet some other examples of the invention, a method for mounting a plurality of batteries within a vehicle is performed that includes: a) providing a vehicle having two frame members extending lengthwise along the vehicle; b) providing a battery box for a plurality of batteries between the two frame members, the battery box including a base and a cover; c) connecting the battery box in between the two frame members via a plurality of bracket members, including fixedly attaching each the bracket members to only one of the two frame members and flexibly attaching each the bracket members to the battery box so as to accommodate relative movement between the battery box and the frame members.

According to yet some other examples, a method for mounting a plurality of batteries within a vehicle is performed that includes: a) providing a vehicle having two frame members extending lengthwise of the vehicle; b) attaching a plurality of brackets to the frame members; c) lowering a battery box onto the brackets; d) fixing the battery box onto the brackets while accessing the battery box from only above the frame members. In some examples, the method further includes providing the battery box as a pre-assembled module containing a plurality of batteries and wiring between the batteries. In some examples, the method further includes providing the battery box as a pre-assembled module including a disconnect switch and/or a jump stud. In yet some other examples, the method further includes flexibly attaching the bracket members to the battery box so as to accommodate relative movement between the battery box and the frame members. In some preferred examples, the method further involves that the fixing the battery box onto the brackets while accessing the battery box from only above the frame members includes screwing a nut onto a stud that extends up from one of the brackets and through a hole in the battery box.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 8(A) is a top perspective view of a battery box similar to that shown in FIG. 2 with mounting brackets attached thereto; and FIG. 8(B) is a top front perspective view of a battery box similar to that shown in FIG. 5 along with an integrated jump stud and disconnect switch according to some illustrative embodiments.

DETAILED DESCRIPTION

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Figure 1:
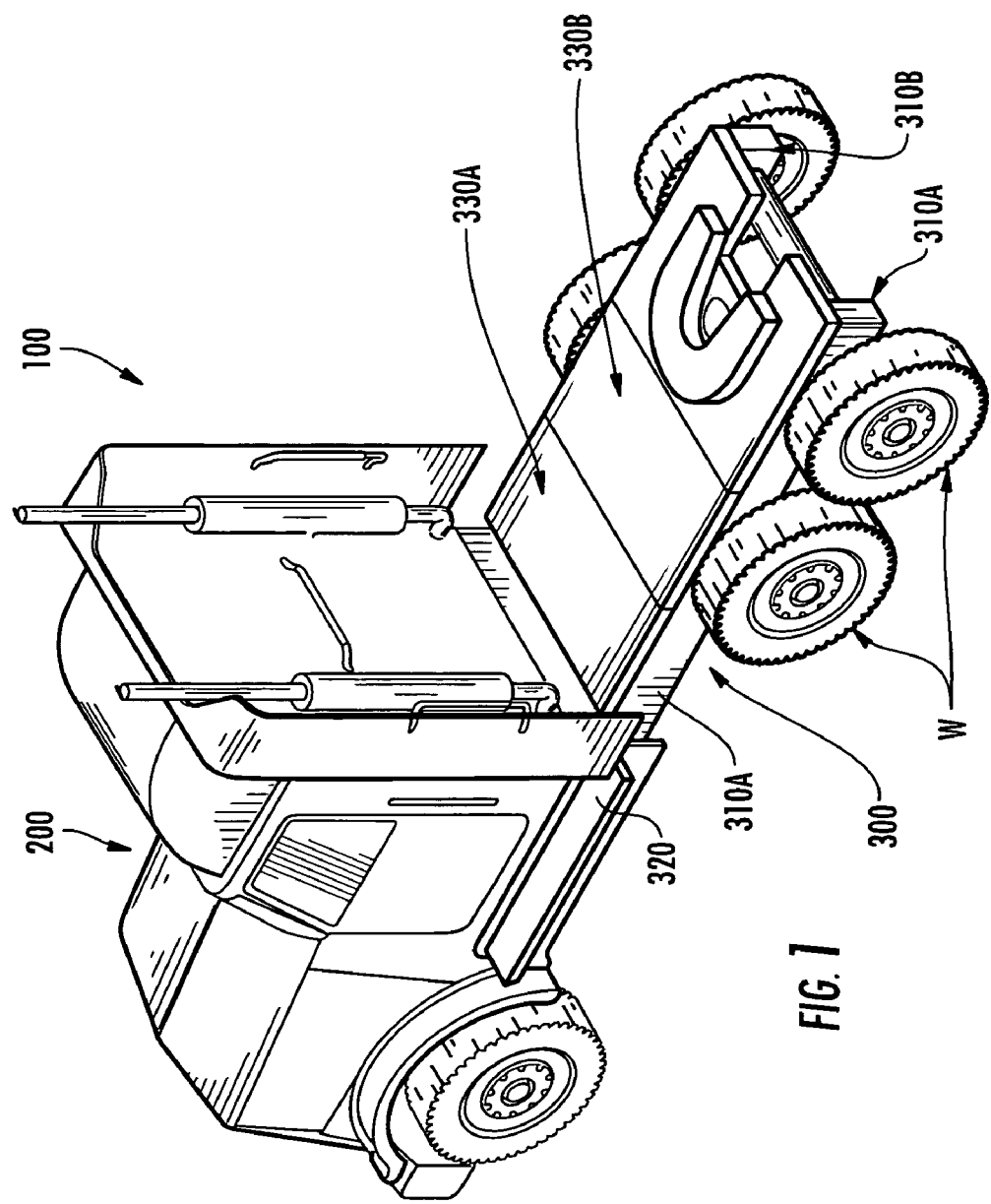
FIG. 1 is a perspective view of an illustrative vehicle within which battery boxes according to some of the preferred embodiments can be implemented.
Figure 2:
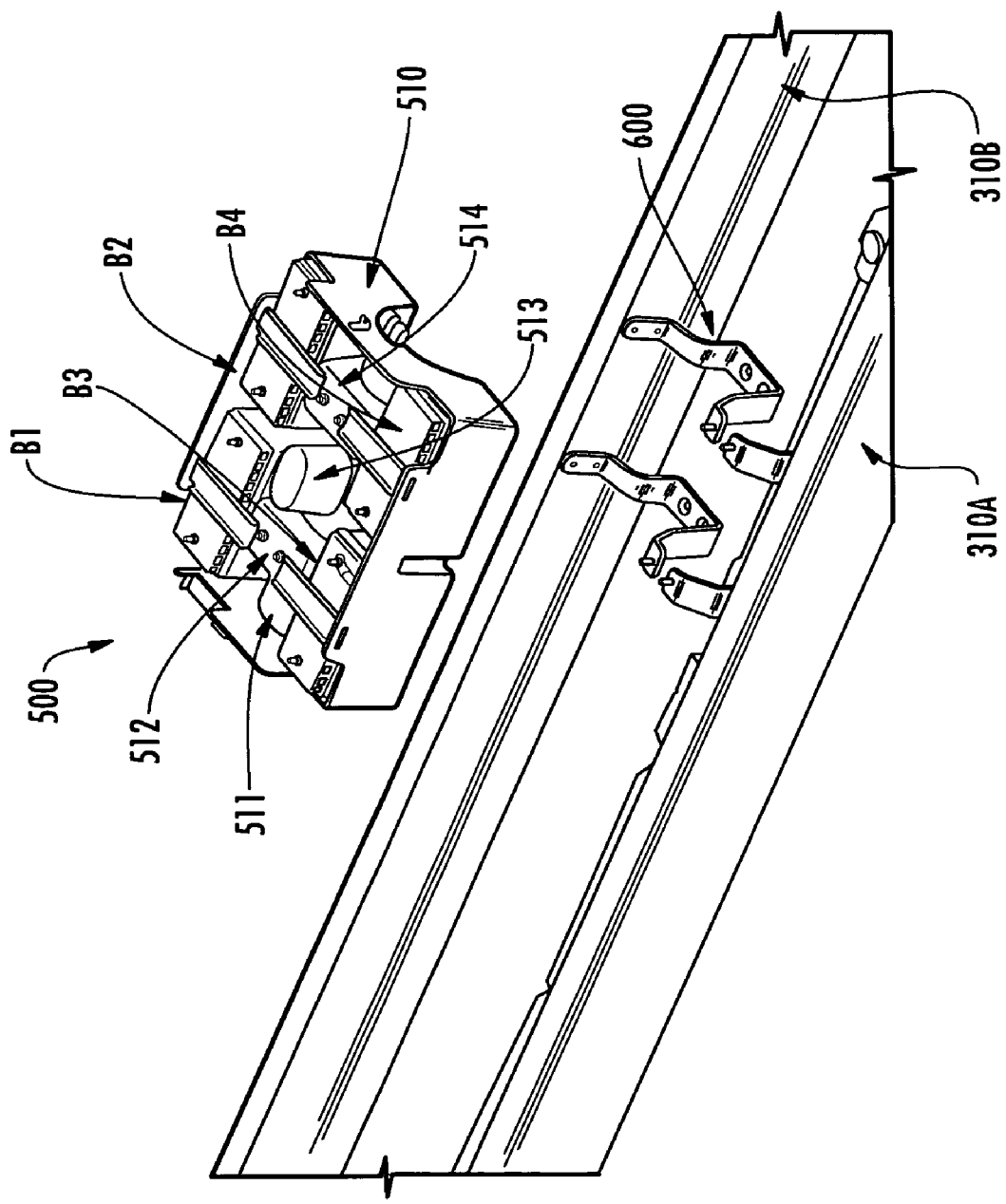
FIG. 2 is a perspective view of a base of a battery box being mounted between frame members of a vehicle according to some illustrative embodiments.

With reference to FIG. 2, in some embodiments of the invention, a battery box 500 is provided that can be mounted between two generally parallel frame members 310A and 310B in a truck, tractor or the like (such as, by way of example, similar to that depicted in FIG. 1). As shown in FIG. 2, in the preferred embodiments, the battery box 500 is mounted to the frame members 310A and 310B using bracket members 600. As best shown in FIGS. 8(A) and 8(B), the battery box 500 preferably includes a cover 520 which is omitted in FIG. 2 so as to allow for viewing inside the battery box. As shown in FIG. 2, the battery box 500 is preferably configured so as to support a plurality of batteries. In the illustrated and non-limiting example, four such batteries B1, B2, B3 and B4 are depicted.

In some preferred embodiments, the battery box 500 can be mounted between such frame members 310A and 310B and, in turn, a deck plate 330 (e.g., see 330A and/or 330B in FIG. 1) can be located there-over.

FIGS. 2 to 4(B) and 6 to 8(A) show a first preferred embodiment of the invention in which an illustrative battery box 500 is mounted between the two frame members 310A and 310B. Referring to FIG. 2, the battery box 500 in this first preferred embodiment includes a substantially rectangular container base 510 having a generally cylindrical hump 511 extending lengthwise along the floor of the base 510 to accommodate a drive shaft of the vehicle.

In this embodiment, the hump 511 includes three extensions 512, 513 and 514 extending upwardly there-from. The extensions 512, 513 and 514 preferably include substantially flat upper surfaces for providing interior support beneath a cover 520 (shown in FIGS. 3 and 6 to 8(A)). In addition, extensions 512 and 514 may also provide a place to attach a bracket 510LP to secure the batteries as described below. While three extensions 512, 513 and 514 are shown in the illustrated embodiment, in some other examples, the extensions can be combined to form less than three extensions (such as, e.g., one or two extension(s)), while in other embodiments more than three extensions can be used.

Figure 3:
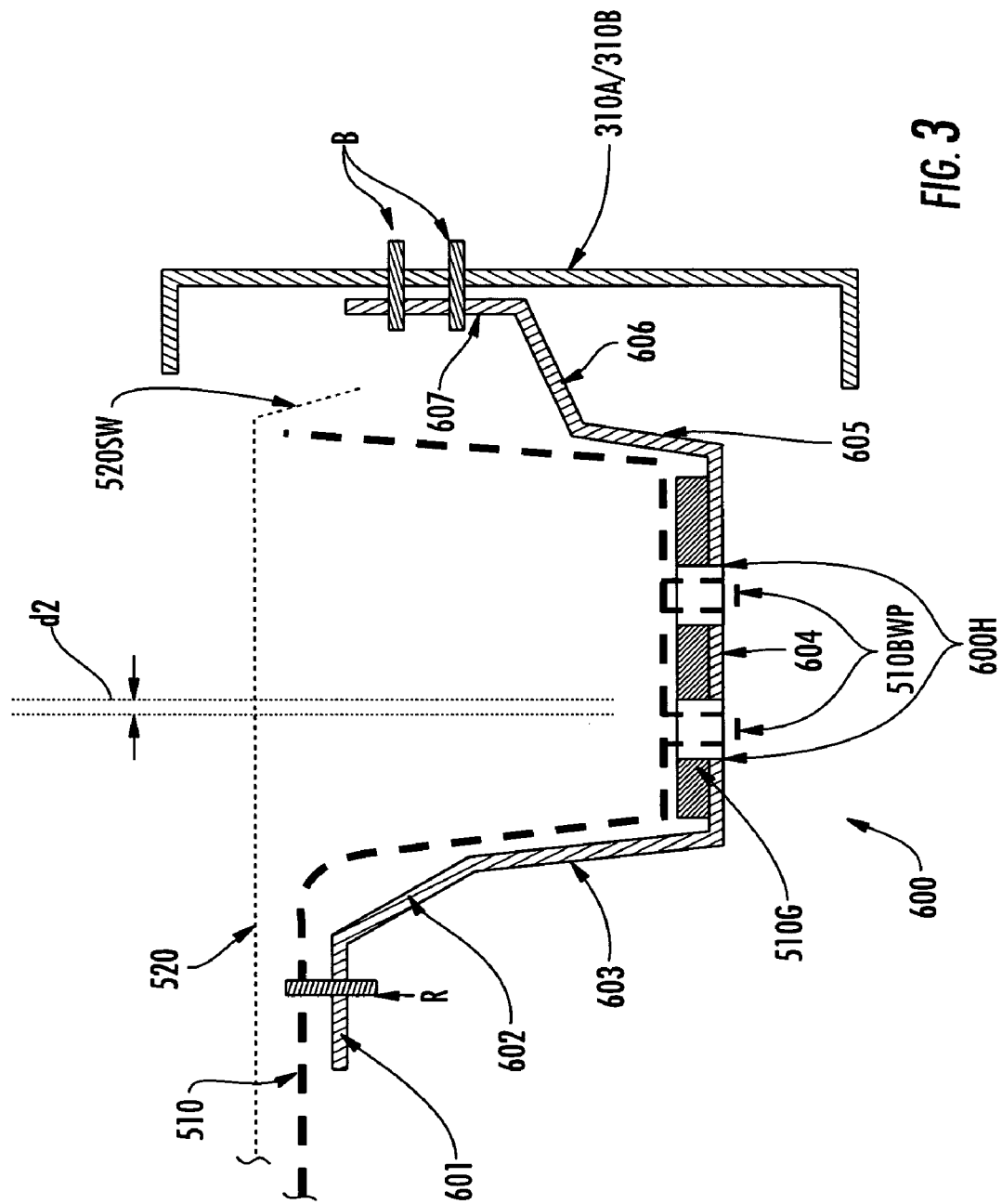
FIG. 3 is a cross-sectional side view taken along line 3-3 in FIG. 8(A) showing a portion of a bracket assembly for a battery box structure according to some illustrative embodiments.
Figure 4B:
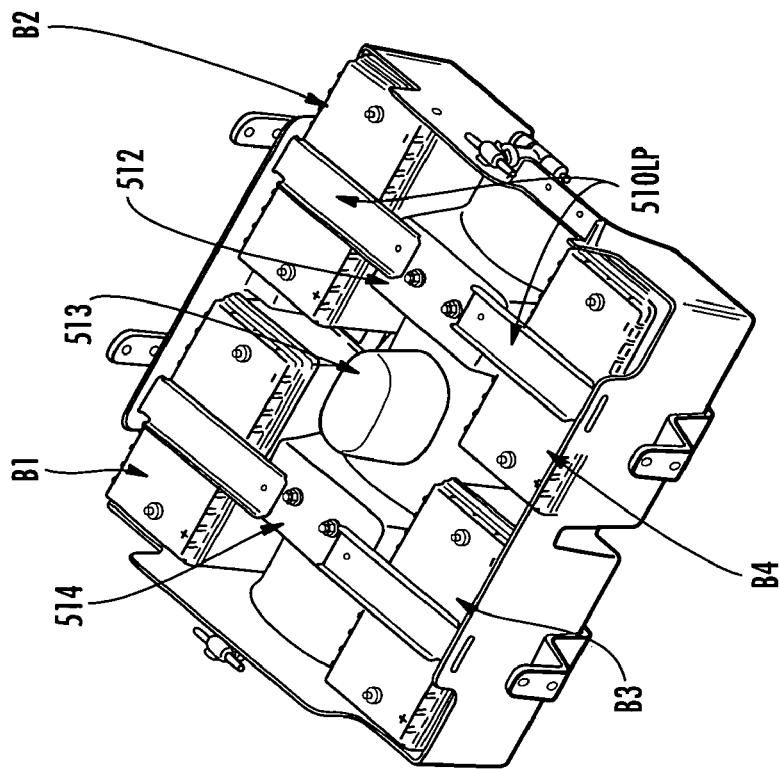
FIG. 4(B) is a top perspective view of the battery box base shown in FIG. 4(A) with batteries therein.
Figure 4A:
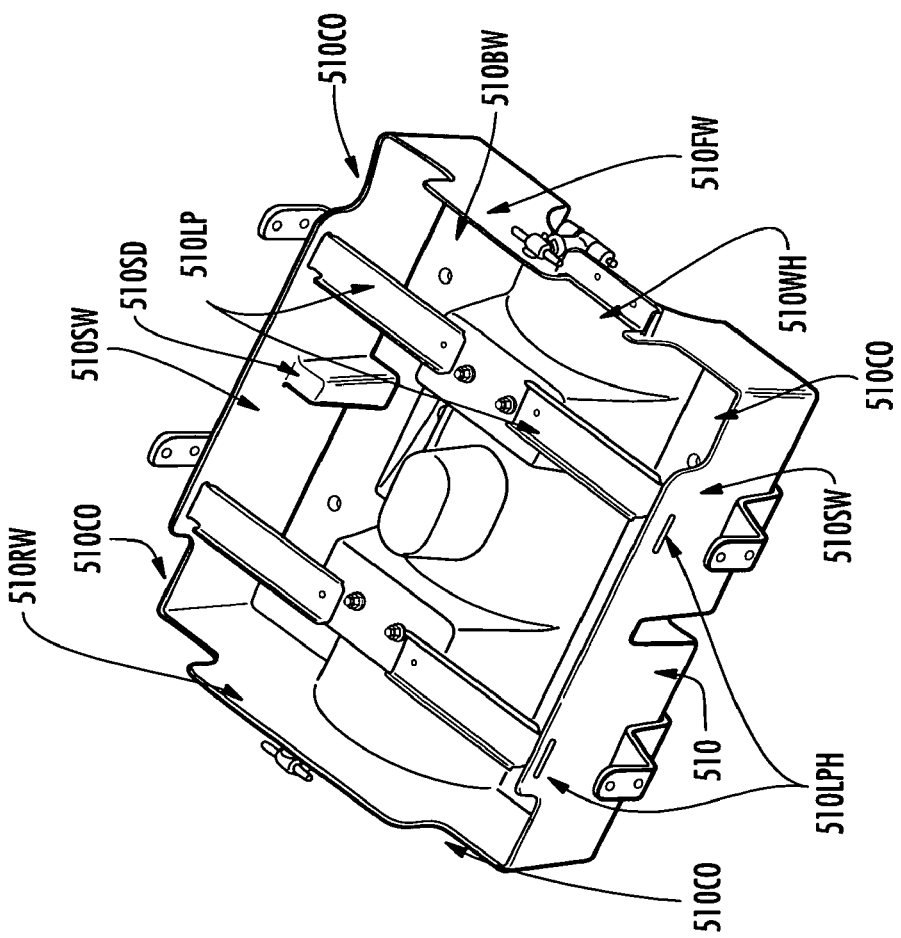
FIG. 4(A) is a top perspective view of a base of a battery box according to some preferred embodiments similar to that shown in FIG. 2 without batteries therein.

With reference to FIGS. 4(A) and 4(B), the container base 510 preferably includes a bottom wall 510BW and four walls including a front wall 510FW, left and right side walls 510SW, and a rear wall 510RW. Each of the four perimeter walls preferably is inclined relative to the bottom wall 510BW so as to form an obtuse angle with the bottom wall, that is, angle slightly outwards, as best seen in, e.g., in FIGS. 3 and 7. The four perimeter walls and the cylindrical hump define receptacle spaces to receive batteries.

As best shown in FIGS. 4(A) and 4(B), the upper ends of the container base 510 preferably include cutout portions 510CO. In the preferred embodiments, the cutout portions 510CO are located proximate the corners of the base 510 as shown. In other embodiments, however, the cutout portions can be at different locations around the perimeter of the base 510.

Figure 6:
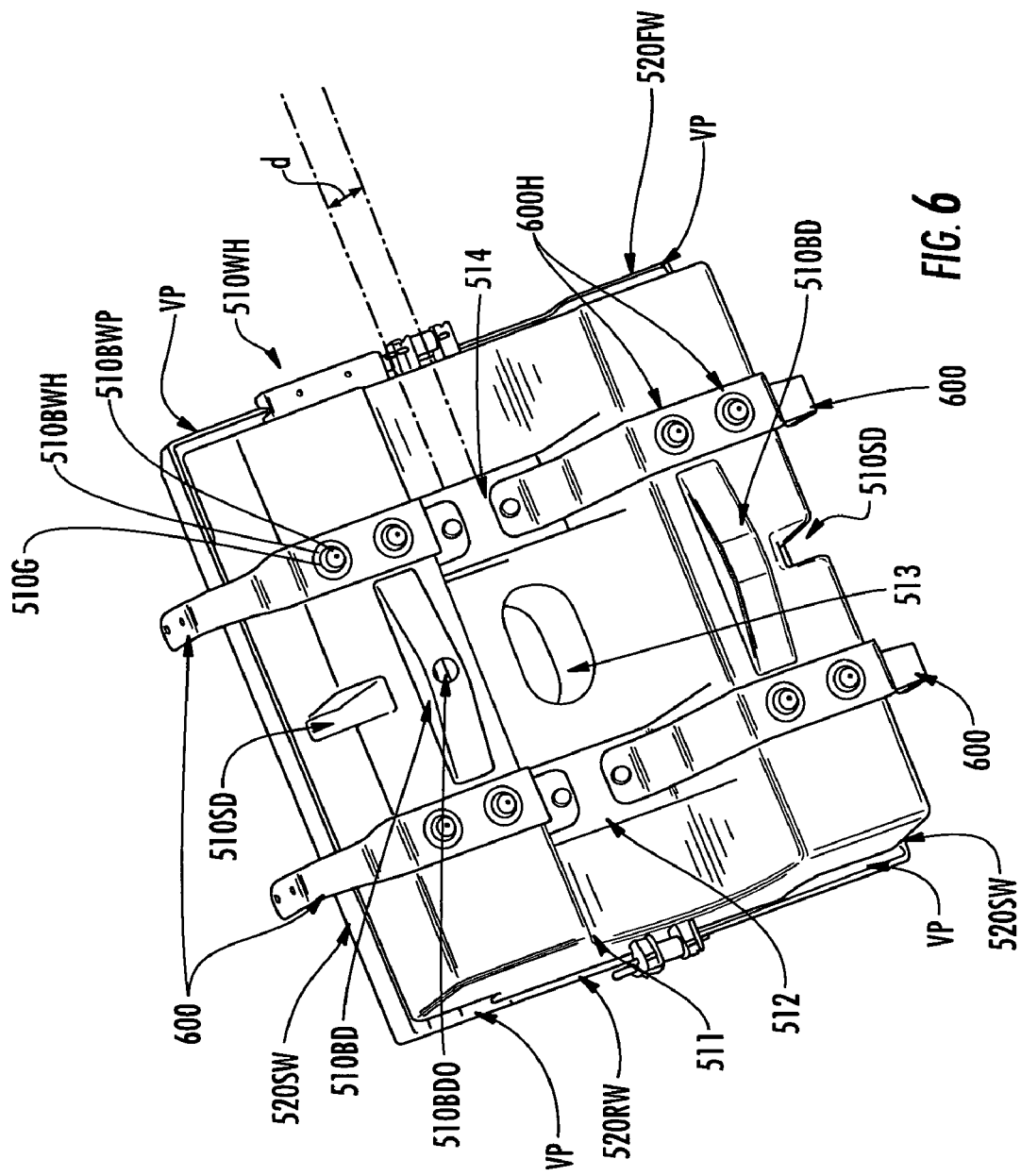
FIG. 6 is a bottom perspective view of the battery box similar to that shown in FIG. 2 with a cover thereon.

In some preferred embodiments, the container base 510 further includes side depressions 510SD as best seen in FIG. 6. Among other things, the side depressions 510SD can be employed to add to the rigidity of the structure and/or so as to help delineate sections in which the batteries reside.

In addition, in some preferred embodiments, the bottom wall 510BW includes depressions 510BD as best seen in FIG. 6. Among other things, the bottom depressions 510BD can be employed to add to the rigidity of the structure, to provide fluid drainage from the battery storage areas, and/or for other purposes. As for fluid drainage functionality, the depressions 510BD can be formed, e.g., so as to angle downwards to openings 510BDO as best seen in FIG. 6.

As also shown in FIG. 6, a plurality of bracket members 600 is provided to mount the base 510 to the frame members 310A and 310B. In the preferred embodiments, the bracket members 600 are configured so as to a) be fixedly attached to one of the frame members 310A or 310B, b) to extend underneath and support the bottom wall 510BW of the base 510 of the container, and c) to extend up to at least one of the extension portions 512/513/514 so as to provide support there-under without interfering with the clearance space provided by the extension portions.

In the preferred embodiments, as shown, rather than utilizing bracket members that span completely between the frame members 310A and 310B, the bracket members 600 are preferably configured so as to extend only partially across the width of the bottom wall 510BW between the frame members 310A and 310B. As shown in FIG. 6, four brackets are provided with the ends of laterally adjacent brackets 600 preferably spaced from one another a distance d. Among other things, using two brackets 600 rather than one bracket to span between frame rails enables the battery box 500 to accommodate relative movement of the frame members 310A and 310B during normal driving conditions (e.g., twisting, parallelogramming, etc.).

To further account for relative movement and/or vibration between parts during normal use of the device, one or more resilient members, such as, e.g., a resilient member (e.g., a rubber cushion) or grommet can be provided in between the base 510 and the brackets 600. For example, as depicted in FIG. 3, a resilient member or grommet 510G can be located between a lower end of the bottom wall 510BW and the bottom segment 604 (discussed below) of the bracket 600, and another resilient member or grommet 510G can be located between the container base 510 and the distal portion 601 (discussed below) of the bracket 600.

As best shown in FIGS. 3 (in broken lines) and 6, the bottom wall of the base 510 preferably includes a plurality of protrusions 510BWP that are arranged to be received within holes 600H cutout of the brackets 600. In the illustrated embodiment, two protrusions are arranged to extend into two respective holes 600H in each respective bracket 600. With reference to FIG. 3, the diameter of the protrusions 510BWP is preferably smaller than the diameter of the holes 600H, such as, e.g., by an amount d2 depicted, so as to accommodate some relative motion between the bracket 600 and the base 510.

As shown in FIG. 3, in the preferred embodiments, the bracket 600 is formed so as to have a first region (such as, e.g., portion 601) that is attached to an underside of the base 510 (such as, e.g., using a threaded stud R that is fixedly attached to the portion 601 and a lock nut N and/or any other appropriate connectors) so as to enhance the support at the upward extensions (e.g., 512 or 514), a second region (such as, e.g., including the portions 602, 603, 605 and 606) that extends beneath the bottom of the container 510, and a third region (such as, e.g., the portion 607) that is attached to a frame member 310A or 310B (such as, e.g., using bolts B and/or any other appropriate connectors). In the preferred embodiments, the brackets 600 are substantially U-shaped, as shown, and include mounting regions proximate the upper ends of the respective arms as shown. While the figures depict some illustrative arrangements of the brackets 600, such as, e.g., including portions 601 to 607 shown as segments in some illustrative and non-limiting embodiments, it should be understood that these are just some illustrative examples and that the brackets 600 can be modified so as to be formed of a single piece of metal bent to an appropriate shape and to have a variety of shapes and configurations depending on circumstances in other embodiments of the invention.

As shown in FIGS. 4(A) and 4(B), in some preferred embodiments, locking brackets 510LP can be removably mounted on the container base 510 so as to retain the batteries B1 to B4 in the battery box during operation of the vehicle. In the illustrated embodiments, the locking brackets 510LP are fastened to the upper ends of the extensions 512 and 514 and inserted in slots in the sidewalls 510SW. By way of example, the brackets 510LP can be attached using any appropriate connectors, such as, e.g., bolts, screws, clasps and/or the like. In prior battery boxes, brackets for retaining batteries extended over corner portions of the batteries, resulting in corner-loading on the cases of the batteries. In the preferred embodiments, however, the brackets 510LP advantageously extend over substantially the mid-sections of the batteries as shown. In this manner, the brackets 510LP do not impart unnecessary loads on the battery cases inside the battery box 500.

Figure 7:
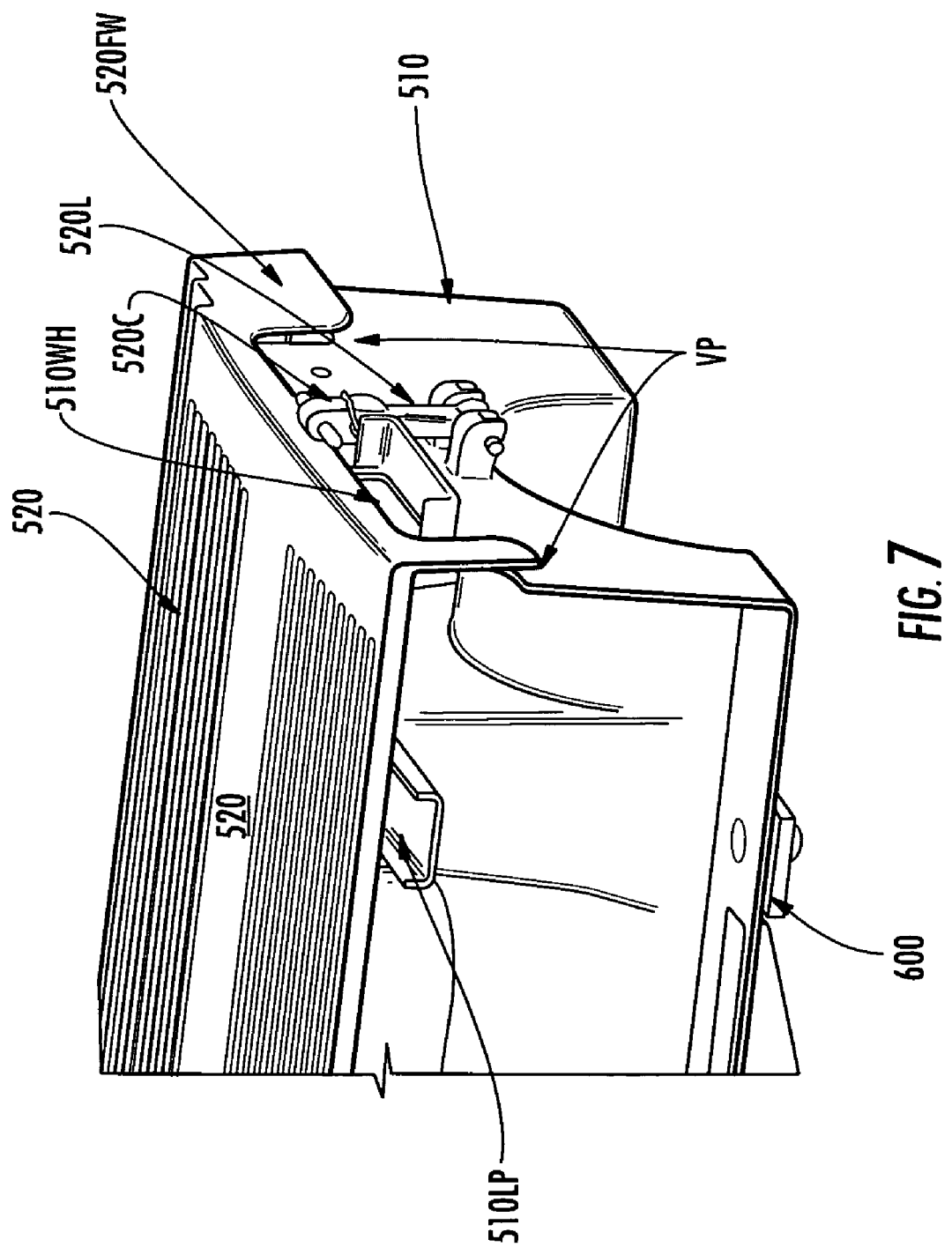
FIG. 7 is a side perspective view of a battery box similar to that shown in FIG. 2 with a side thereof cut-away to facilitate viewing the interior of the battery box for illustrative purposes.

With reference to FIGS. 3, 6, 7, 8(A) and 8(B), in the preferred embodiments, the battery box 500 includes a cover or lid 520. In the preferred embodiments, the cover 520 includes a generally planar top wall 520TW, a depending front wall 520FW, left and right depending side walls 520SW and a depending rear wall 520RW. Among other things, the depending front wall 520FW, depending side walls 52SW and depending rear wall 520RW are preferably constructed so as to angle outwards slightly relative to the top wall 520TW as best seen in FIGS. 3 and 7. As a result, the container base 510 flares outward in an upward direction while the cover 520 flares outward in a downward direction as shown providing a gap between the depending walls of the cover and the walls of the base. In the preferred embodiments, the depending walls 520FW, 520SW and 520RW are preferably sized so as to facilitate locating of the cover over the top of the base 510 (such as, e.g., with the depending walls locating the cover in position over the base 510). In addition, preferably the depending walls 520FW, 520SW and 520RW are configured so as to extend over the entire or substantially the entire height of the cutout portions 510CO, as shown in the figures.

In some preferred embodiments, the cover is configured so as to distribute a load applied on the top of the cover 520 towards the sides adjacent the frame members and over the brackets. Among other things, by way of example, such a construction can provide assistance in the event that, e.g., an individual steps on the cover 520 or otherwise applies a load over the cover 520. By way of example, as shown in FIGS. 8(A) and 8(B), the cover 520 can include a stepped configuration 520ST proximate the side edges. Moreover, in some embodiments, the cover 520 can even be made so as to rest only the sides 510SW (without deflection of the cover 520) such that less force is applied along a center of the battery box in many circumstances.

Among other things, by extending the depending walls 520FW, 520SW and 520RW over the cutout portions 510CO, air vent passages VP can be advantageously formed between the cover 520 and the base 510 while the cover 520 can still be configured so as to substantially obstruct and cover the base 510. In that regard, the air vents VP are preferably formed by the oppositely inclined depending walls of the cover 520 and the walls of the base 510, such that even though the depending walls extend downward over the walls of the base 510, a vent path VP is still formed there-between as best seen in FIG. 7. Among other things, this provides for a more aesthetic appearance because the interior of the battery box is obstructed from view and also provides for, among other things, enhanced shielding of the interior of the battery box from external objects, weather or the like. By way of example, fluid flow over the cover 520 due to, e.g., spillage, leakage, rain and/or other conditions will have a reduced likelihood of entering the battery box due to the overhanging vent structure according to the preferred embodiments.

Referring now to FIGS. 7 and 8(A) to 8(B), in some embodiments at least one latch mechanism(s) 520L is provided to help retain the cover 520 upon the base 510. In this regard, in the preferred embodiments, the latch mechanism 520L is fixedly attached to one of the cover 520 or the base 510 and includes a distal end that is releasably engaged/disengaged with the other of the cover 520 or the base 510. In some preferred embodiments, the latch mechanism includes a flexible or resilient material, such as, e.g., a rubber or the like that is pivotally attached to one of the cover 520 or the base 510 and that includes an engagement member on a distal end thereof, while the other of the cover 520 or the base 510 includes a catch 510C that can releasably engage with the engagement member. By way of example, the engagement member can include, e.g., a widened region that can be engaged within a hook or the like on the catch 510C. For example, in use, the resilient member can be stretched (e.g., manually by an individual) and the widened region can be located within the hook so as to retain the cover 520 or the widened region can be removed from the hook so as to release the cover 520. In the illustrated embodiment, the latch mechanism 520L is mounted on the base 510 and the catch member 520C is mounted on the cover, but in other embodiments, as described above, this arrangement can be reversed. Among other things, the use of a flexible latch mechanism has some advantages related to, e.g., a) the ability to use non-conducting materials for the battery box, including the latch mechanism, b) the enablement of lightweight and long-lasting materials to be employed, etc.

Figure 5:
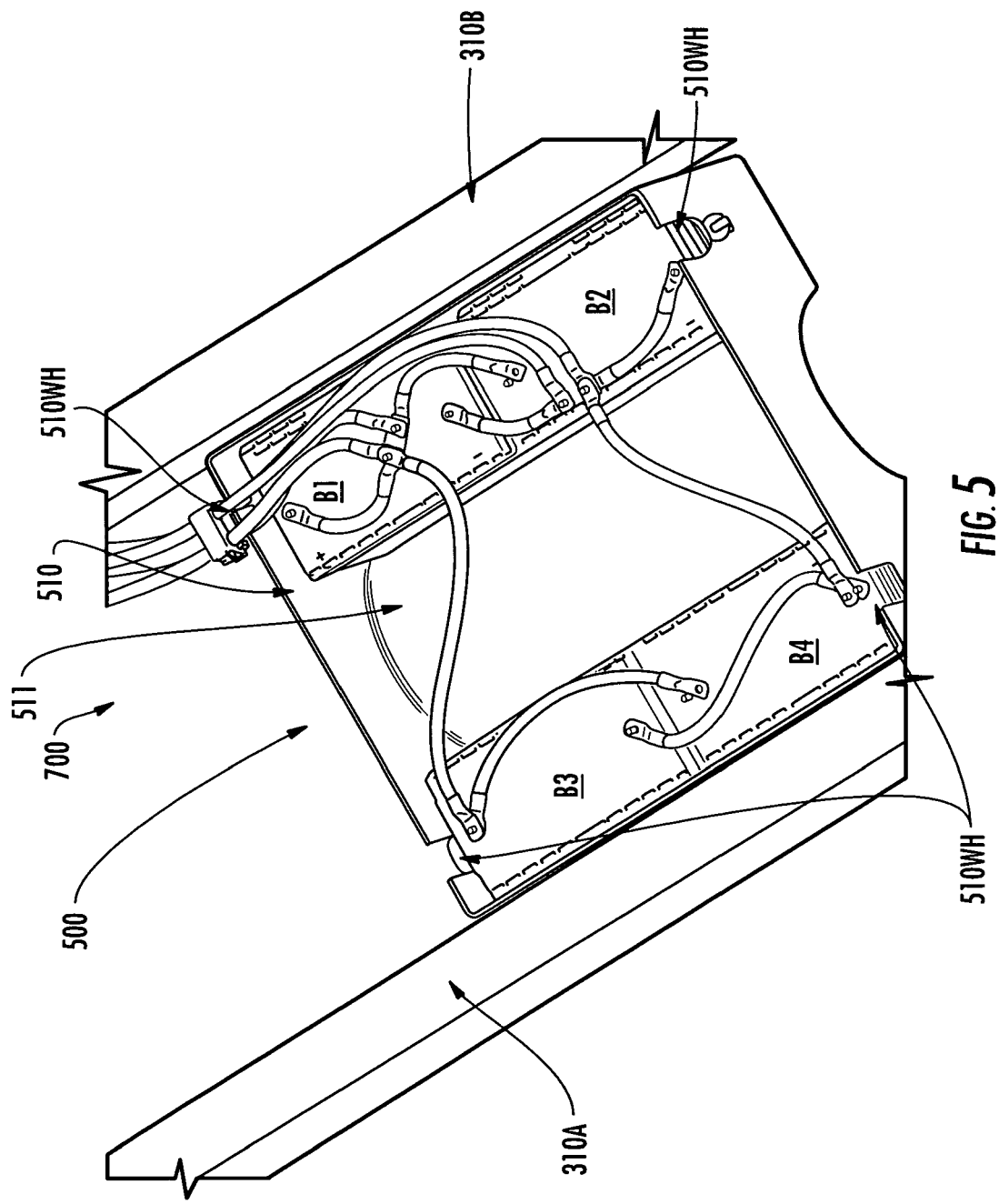
FIG. 5 is a top perspective view of another embodiment showing a battery box base as mounted between frame members of a vehicle.

Referring now to FIG. 5, this figure shows another embodiment of the invention in which an illustrative battery box 500 is mounted between the two frame members 310A and 310B. In this illustrative example, the battery box 500 is similarly depicted as including a substantially rectangular container base 510 and a generally cylindrical hump 511 extending lengthwise along the floor of the base 510. In order to allow for wiring and/or venting, a plurality of cut-outs 510WH can be provided proximate respective battery locations as shown in FIG. 5. FIG. 5 also depicts an illustrative manner of wiring the batteries contained within the battery box enclosure 500 according to some illustrative and non-limiting embodiments. Various other wiring methods can be employed as would be appreciated by those in the art. In addition, while FIG. 5 shows an embodiment that is slightly modified from that shown in FIGS. 2 to 4(B) and 6 to 8(B), the wiring methods used in FIG. 5 can be employed within any of the embodiments shown herein where appropriate. Moreover, while FIG. 5 does not depict a cover 520, it should be understood that the device of FIG. 5 can include an appropriate cover 520 similar to that described above.

FIG. 8(B) depicts yet another embodiment of the invention which is generally similar to the embodiment shown in FIG. 5 and which includes an integrated jump stud JS (e.g., a jump plug or battery connector) and a disconnect switch DS. Although such a jump stud JS and disconnect switch DS can be integrated in some embodiments, in some preferred embodiments, such as, e.g., shown in the other figures, jump stud and disconnect switch integration is not employed. In some other preferred embodiments, such as, e.g., shown in FIG. 5, another bracket member 700 can be employed for mounting jump stud and/or disconnect switches or the like.

Referring again to FIG. 2, in some preferred embodiments of the invention, the battery box can be easily and efficiently mounted upon the vehicle frame members 310A and 310B. In the preferred embodiments, the ease of mounting is enhanced by constructing the battery box components in a manner to allow an individual to install the battery box without any need to access the battery box components from beneath the frame members 310A and 310B. In contrast, prior battery boxes have required an individual to access the battery box from beneath the battery box in order to mount it onto the vehicle. In this regard, as described above, in the preferred embodiments, the brackets 600 can be initially attached to the frame members 310A and 310B as shown in FIG. 2. Then, the battery box 500 can be lowered onto the brackets such that the protrusions 510BWP fit into the holes 600H and such that the stud R fixed to the portion 601 extends upward through a corresponding receiving hole 510R formed in the base 510. Thereafter, the nut N can be threaded onto the top end of the stud R from above the battery box assembly so as to retain the battery box 500 fixedly upon the frame members 310A and 310B. As a result of this unique mounting structure, the battery box can be easily and efficiently mounted upon the frame members 310A and 310B.

In addition, in some of the preferred embodiments described above, the battery box 500 can be mounted in a manner that enhances the durability of the device, such as, e.g., by isolating the battery box from vibration and/or by accommodating loads applied to the frame structure that result in, e.g., twisting, rolling, bending, or parallelogramming of the frame members. In some embodiments, the stiffness of the battery box structure can be about ⅙ or less of the stiffness of a typical frame cross-member, resulting in, among other things, longer durability.

In addition, in some of the preferred embodiments described above, the battery box can be easily and efficiently mounted as a pre-assembled, self-contained module. By way of example, in some preferred embodiments, the battery box 500 can include, e.g., batteries mounted therein along with wiring between the batteries (such as, e.g., similar to that shown in FIG. 5). In addition, as described above, in some embodiments, the battery box can include pre-assembled jump studs and/or disconnect switches integrated therein. In such cases, the wiring associated with such pre-assembled components can be readily contained and located inside the battery box. As a result, the battery box 500 can operate as an easy and efficient module that can be readily installed upon a vehicle. Moreover, as described above, the wiring, connections and other components located inside the battery box can be well maintained and isolated from external contaminants due to, among other things, the unique venting structure as described above (such as, e.g., in which the vent paths VP are substantially obstructed from the environment).

In the preferred embodiments, the battery box 500, including the base 510 and the cover 520 can be formed using plastics, polymers, fiber glass and/or the like materials. Among other things, materials having some resiliency and non-conductive properties are preferable for such components. Nevertheless, various other embodiments can include a variety of other materials depending on circumstances. In addition, in the preferred embodiments, the brackets 600 are formed of metal material(s), such as, e.g., aluminum, stainless steel and/or any other appropriate material(s) as would be suitable for purposes described herein as would be understood by those in the art based upon the present disclosure.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "or example."

What is claimed is:

1. A method for mounting a plurality of batteries within a vehicle, comprising:
   a) providing a vehicle having two frame members extending generally parallel lengthwise along the vehicle for substantially an entire length of the vehicle;
   b) providing a battery box for a plurality of batteries between said two frame members, the battery box including a base including a bottom wall and a cover;
   c) providing a plurality of bracket members formed as generally U-shaped members;
   d) connecting the battery box in between the two frame members via the plurality of bracket members, including fixedly attaching one leg of each said bracket members to only one of said two frame members and flexibly attaching a second leg of each said bracket members to the base of said battery box with a battery receptacle within said battery box positioned between said legs so that said U-shape extends beneath said receptacle so as to accommodate relative movement between the battery box and the frame members and relative movement between the frame members.

2. The method of claim 1, wherein said flexibly attaching includes mounting said bracket members to said battery box with at least one resilient member between said bracket members and said battery box.

3. The method of claim 1, wherein said flexibly attaching includes mounting said bracket members to said battery box with tolerance in movement between said bracket members and said battery box.

4. The method of claim 3, further including providing said tolerance in movement via at least one protrusion on one of said battery box or said brackets that is loosely received within at least one hole of the other of said battery box and said brackets.

5. A vehicle with an improved battery box mounting structure, comprising:
   a) two frame members extending lengthwise of said vehicle;
   b) a battery box between said two frame members, said battery box including a base having a bottom wall with upwardly extending perimeter walls and a cover with downwardly extending perimeter walls;
   c) a plurality of bracket members attaching said battery box between said two frame members, wherein each said bracket members are fixedly attached to only one of said two frame members and are flexibly attached to said battery box so as to accommodate relative movement between the battery box and the frame members and wherein said bracket members are generally U-shaped and wherein one leg of said U-shape is fixed to one of said frame members and an opposite leg of said U-shape is attached to said base of said battery box with a battery receptacle within said battery box positioned between said legs such that said U-shape extends beneath said receptacle.

6. The vehicle of claim 5, wherein said bracket members being flexibly attached includes said bracket members being mounted to said battery box with tolerance in movement between said bracket members and said battery box.

7. The vehicle of claim 6, wherein said tolerance in movement includes at least one protrusion on one of said battery box or said brackets that is loosely received within at least one hole of the other of said battery box and said brackets.

8. The vehicle of claim 5, wherein said bracket members being flexibly attached includes said bracket members being mounted to said battery box with at least one resilient member between said bracket members and said battery box.

9. A method for mounting a plurality of batteries within a vehicle, comprising:
   providing a vehicle having two frame members extending lengthwise along the vehicle;
   providing a battery box for a plurality of batteries between said two frame members, the battery box including a base and a cover;
   connecting the battery box in between the two frame members via a plurality of bracket members, including fixedly attaching each said bracket members to only one of said two frame members and flexibly attaching each said bracket members to said battery box so as to accommodate relative movement between the battery box and the frame members, and further including providing said bracket members as generally U-shaped members with one leg of said U-shape fixed to at least one of said frame members and the other leg of said U-shape attached to said base of said battery box with a battery receptacle within said battery box positioned between said legs so that said U-shape extends beneath said receptacle.

10. The method of claim 9, wherein said flexibly attaching includes mounting said bracket members to said battery box with at least one resilient member between said bracket members and said battery box.

11. The method of claim 9, wherein said flexibly attaching includes mounting said bracket members to said battery box with tolerance in movement between said bracket members and said battery box.

12. The method of claim 11, further including providing said tolerance in movement via at least one protrusion on one of said battery box or said brackets that is loosely received within at least one hole of the other of said battery box and said brackets.

* * * * *